(12) United States Patent
Lindell

(10) Patent No.: US 11,166,446 B2
(45) Date of Patent: Nov. 9, 2021

(54) FISHING ASSEMBLY

(71) Applicant: Jeffrey Lindell, Brooklyn Park, MN (US)

(72) Inventor: Jeffrey Lindell, Brooklyn Park, MN (US)

( * ) Notice: Subject to any disclaimer, the term of this patent is extended or adjusted under 35 U.S.C. 154(b) by 256 days.

(21) Appl. No.: 16/421,853

(22) Filed: May 24, 2019

(65) Prior Publication Data

US 2020/0367480 A1 Nov. 26, 2020

(51) Int. Cl.
| | |
|---|---|
| *A01K 87/00* | (2006.01) |
| *A01K 87/02* | (2006.01) |
| *A01K 97/12* | (2006.01) |
| *A01K 97/01* | (2006.01) |
| *A01K 89/015* | (2006.01) |

(52) U.S. Cl.
CPC .......... *A01K 87/007* (2013.01); *A01K 87/025* (2013.01); *A01K 89/0192* (2015.05); *A01K 97/01* (2013.01); *A01K 97/125* (2013.01)

(58) Field of Classification Search
CPC ...... A01K 87/00; A01K 87/02; A01K 87/025; A01K 87/08; A01K 87/10; A01K 97/01; A01K 97/10
See application file for complete search history.

(56) References Cited

U.S. PATENT DOCUMENTS

| | | | |
|---|---|---|---|
| 685,185 A | 10/1901 | Smith | |
| 827,972 A | 8/1906 | Grignon | |
| 1,716,220 A * | 6/1929 | Ferguson | A01K 97/10 248/518 |
| 2,168,938 A | 8/1939 | Klein | |
| 2,184,583 A | 12/1939 | Danko | |
| 2,344,132 A | 3/1944 | Coxe | |
| 2,463,108 A | 3/1949 | Jacobson | |
| 2,553,480 A | 5/1951 | Seifert | |
| 2,554,927 A * | 5/1951 | Schultz, Jr. | A01K 97/01 43/16 |
| 2,642,692 A | 6/1953 | Smith | |
| 2,798,126 A | 7/1957 | Burge | |
| 2,995,855 A | 8/1961 | Bell | |
| 3,012,353 A | 12/1961 | Leech | |
| 3,074,196 A | 1/1963 | Bronson, Sr. | |
| 3,354,573 A * | 11/1967 | Johansson | A01K 97/01 43/21.2 |
| 3,484,066 A | 12/1969 | Aunspaugh | |
| 3,546,805 A | 12/1970 | Schaeffer | |
| 3,556,365 A * | 1/1971 | Bull | A01K 97/10 224/162 |
| 3,570,793 A | 3/1971 | Shackel | |
| 3,584,408 A * | 6/1971 | Frick | A01K 97/10 43/17 |
| 3,669,390 A * | 6/1972 | Nielson | A01K 97/10 248/514 |
| 3,686,852 A | 8/1972 | Ingram et al. | |

(Continued)

FOREIGN PATENT DOCUMENTS

GB 2191071 12/1987

*Primary Examiner* — Richard G Davis
(74) *Attorney, Agent, or Firm* — Thomas J. Nikolai; DeWitt LLP

(57) ABSTRACT

A fishing device adapted to be used hands-free and generate an alert when a fish is hooked is ideally suited to be used in confined spaces such as an ice fishing shelter.

17 Claims, 5 Drawing Sheets

(56) References Cited

U.S. PATENT DOCUMENTS

| | | | |
|---|---|---|---|
| 3,802,652 A * | 4/1974 | Holton, Jr. | A01K 97/10 248/534 |
| 3,964,706 A | 6/1976 | Adams | |
| 4,177,595 A | 12/1979 | Chon | |
| 4,422,258 A | 12/1983 | Adams et al. | |
| 4,471,554 A | 9/1984 | Heiskell | |
| 4,750,286 A | 6/1988 | Gray | |
| 4,949,498 A * | 8/1990 | Cecchetti | A01K 97/10 248/541 |
| 5,199,665 A * | 4/1993 | Tipton | A01K 89/0102 242/238 |
| 5,560,137 A * | 10/1996 | Herring | A01K 97/10 248/514 |
| 5,943,808 A | 8/1999 | Bryant | |
| 6,421,948 B1 | 7/2002 | Craig | |
| 6,898,893 B1 | 5/2005 | Mukdaprakorn | |
| 7,254,915 B2 | 8/2007 | Mrotek | |
| 7,434,348 B1 | 10/2008 | Welch | |
| 7,739,827 B2 | 6/2010 | Keller | |
| 9,420,775 B1 * | 8/2016 | Ridler | A01K 97/125 |
| 2003/0144065 A1 * | 7/2003 | Palmer | A01K 87/00 473/138 |
| 2012/0017487 A1 * | 1/2012 | O'Keefe | A01K 97/10 43/21.2 |
| 2013/0000178 A1 * | 1/2013 | Neeley | A01K 87/02 43/22 |
| 2014/0352195 A1 * | 12/2014 | Peterson | A01K 97/01 43/15 |
| 2018/0279594 A1 * | 10/2018 | Raskas | G05D 1/0016 |

* cited by examiner

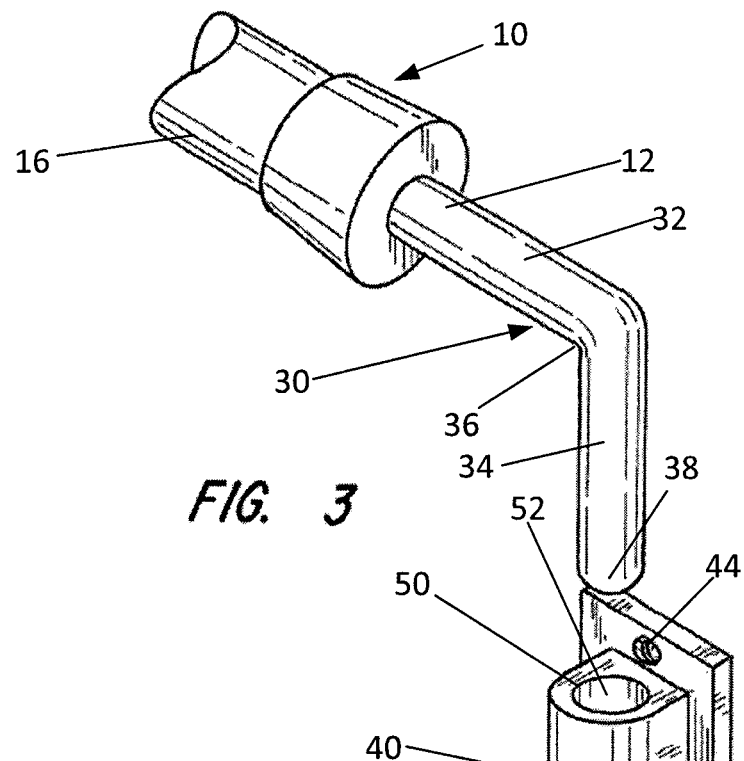
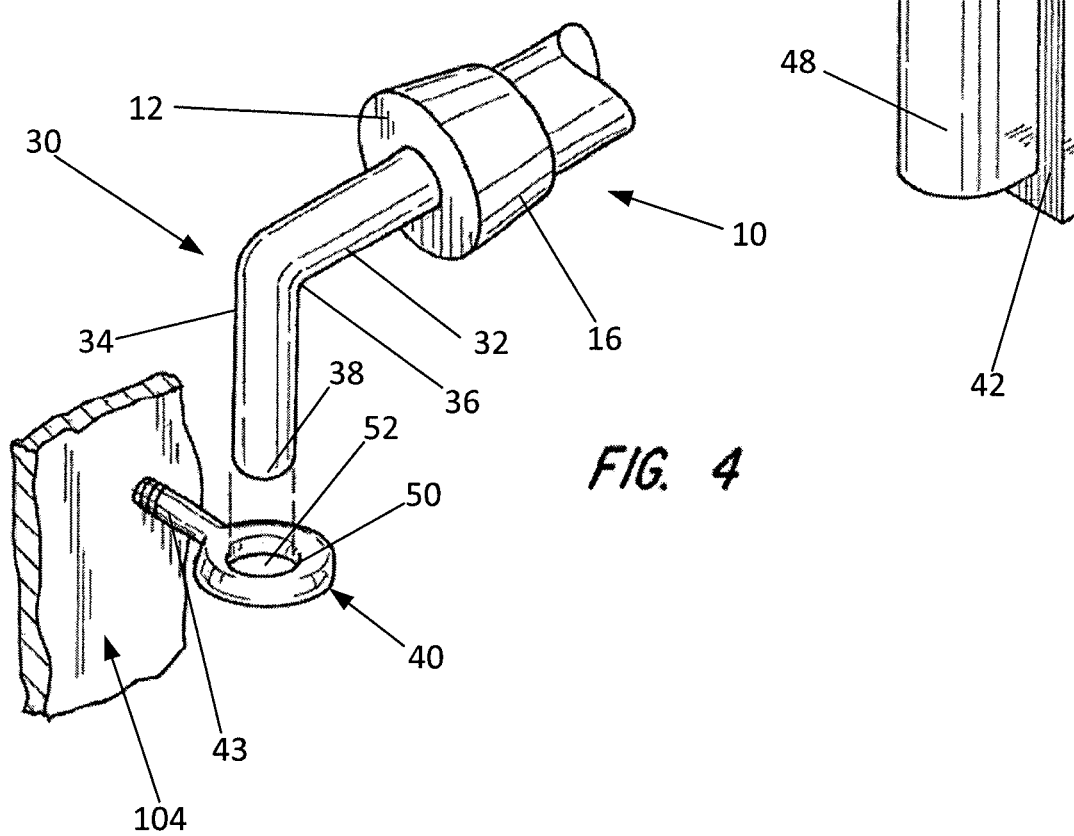

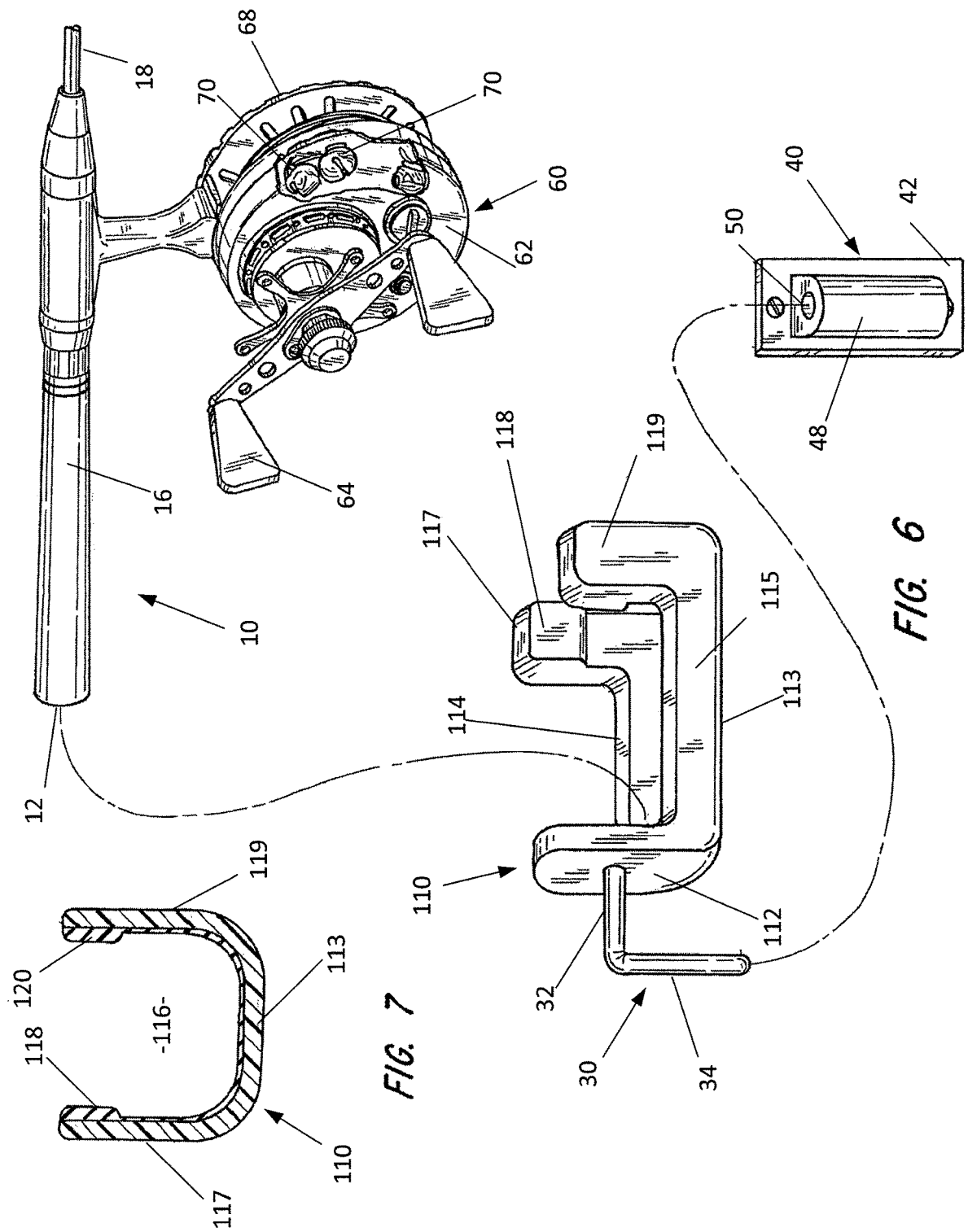

FISHING ASSEMBLY

CROSS-REFERENCED TO RELATED APPLICATIONS

Not applicable

STATEMENT REGARDING FEDERALLY SPONSORED RESEARCH OR DEVELOPMENT

Not applicable

BACKGROUND OF THE INVENTION

I. Field of the Invention

The present invention relates to the sport of fishing. More specifically, the present invention relates to fishing equipment specifically adapted for use when ice fishing within an ice fishing shelter.

II. Discussion of the Prior Art

Fishing is an activity that has been employed to provide nutritional sustenance for centuries. In more modern times, fishing has also become a recreational activity enjoyed by many.

In northern states, such as Minnesota, Wisconsin and the Upper Peninsula of Michigan, ice fishing has become a popular winter activity. As soon as the lake ice is safe, people trek out over the ice to a favored fishing spot. Once there, they employ an auger to cut a hole through the ice. They fish by deploying a line, hook and bait through the hole to the water and fish below.

The sport of ice fishing is only possible because of the harsh winter conditions that cause the lake water to freeze. However, the cold temperatures and wind blowing across the frozen lake will cause even the most avid fan of the sport to quickly seek shelter. To protect themselves from harsh winter elements so that fishing may continue for a longer period of time, men, women and children who participate in the sport of ice fishing often deploy various shelters around and over the hole(s) cut through the ice. Such shelters are typically relatively compact because they need to be moved onto the ice after the lake freezes and off the ice before the lake thaws. Such shelters come in many forms and are made of many different materials. Some shelters are set up like a tent supported by aluminum or fiberglass poles. Others are constructed of wood and supported on skis or wheels so they cam be towed on and off the ice using a snowmobile, all-terrain vehicle (ATV), utility terrain vehicle (UTV), car or truck.

Part of the enjoyment of ice fishing results from the comradery that exists when people gather and fish together in such cramped shelters. Such comradery is enhanced when those gathered enjoy food, drink or even a game of cards while they are fishing.

For these and other reasons, standard fishing rod and reel systems are not suitable for use when ice fishing. Standard fishing rods are simply too long to fit inside typical ice fishing shelters. Even when larger shelters are employed, the length of a standard fishing rod makes it difficult to manipulate within the shelter. Inattentiveness to the actual fishing endeavor often arises from the other activities that are occurring within the shelter. These other activities, such as eating or playing cards, require the use of both hands of the participant making it difficult for the participant to hold and operate the rod at the same time. Some people enjoying the activity even take a nap or sleep overnight in their ice fishing shelters leaving their hooks in the water as they rest.

Similar problems arise when teaching children and other inexperienced people to fish even during the warm summer months. Standard rods are often too long for young children to manipulate and shorter rods are more difficult to use when casting. Young children tend to have shorter attention spans. They become inattentive and need to be alerted when a fish is hooked on the end of their line. If would also be helpful to be able to have a rod temporarily held handsfree at various times such as when a child or other inexperienced person is baiting a hook.

SUMMARY OF THE INVENTION

Each of the foregoing problems is solved by providing a fishing device having certain features. First, the fishing device preferably comprises an elongate rod extending between a first end and a second end. The rod is adapted to deflect when the first end is held and a force is applied to the second end. The rod is also adapted to return to an undeflected state when the force is removed. A longitudinal axis is defined by the elongated rod when the elongated rod is in the undeflected state. The rod is preferably made in sections which are adapted to telescope so that the length of the rod can be adjusted permitting the rod to be used and manipulated within a compact ice fishing shelter or by smaller children. A rod with telescoping sections also can be reduced in length so that the rod takes up less space when transported or stored when not in use.

Second, the fishing device comprises an attachment member comprising a first leg and a second leg. The first leg is adapted to be coupled to the first end of the elongated rod and extend rearwardly from the elongated rod along the longitudinal axis described above. The second leg extends from the first leg at an angle between 15 and 135 degrees, 90 degrees being a typical angle between the first leg and the second leg. The second leg is adapted to be inserted into a bracket mounted to a vertical surface, such as a wall of an ice fishing shelter. This permits the entire fishing device to be temporarily held in place handsfree, allowing the person fishing to use their hands to carry out other activities.

Third, the fishing device comprises a reel coupled to the elongated rod. The reel includes a housing and a spool of line located within the housing. The spool is adapted to rotate so that line can be extended from or retracted within the reel. The fishing device further comprises an alarm to signal when a fish has been hooked. The alarm may be bells or glass beads positioned inside the housing of the reel that will make an alerting sound as the spool rotates within the reel's housing.

The fishing rod of the fishing device may have a standard handle and standard eyelets. Preferably, the rod will also include one or more finger tabs. Such tabs allow a user fishing in the cold, with gloves or mittens on, to both grip the handle on the first end of the rod and the finger tab(s) on the second end of the rod so the rod can be telescoped to any length between a fully extended condition and a fully retracted condition. Such tabs also make it easier for young children to grip the rod and telescope the sections.

BRIEF DESCRIPTION OF THE DRAWINGS

The foregoing features, objects and advantages of the invention will become apparent to those skilled in the art from the following detailed description of the preferred embodiment, especially when considered in conjunction with the accompanying drawings in which like numerals in the several views refer to corresponding parts:

FIG. 3 is a perspective view illustrating a bracket that may be coupled to a vertical surface and used to temporarily couple the fishing device of FIG. 1 to the vertical surface;

FIG. 4 is a perspective view illustrating an alternative bracket that may be coupled to a vertical surface and used to temporarily couple the fishing device of FIG. 1 to the vertical surface;

FIG. 6 is a perspective view of an alternative embodiment of the fishing device; and FIG. 7 is a cross-sectional view of the mounting device for the attachment member shown in FIG. 6.

DESCRIPTION OF THE PREFERRED EMBODIMENT

Figure 1:
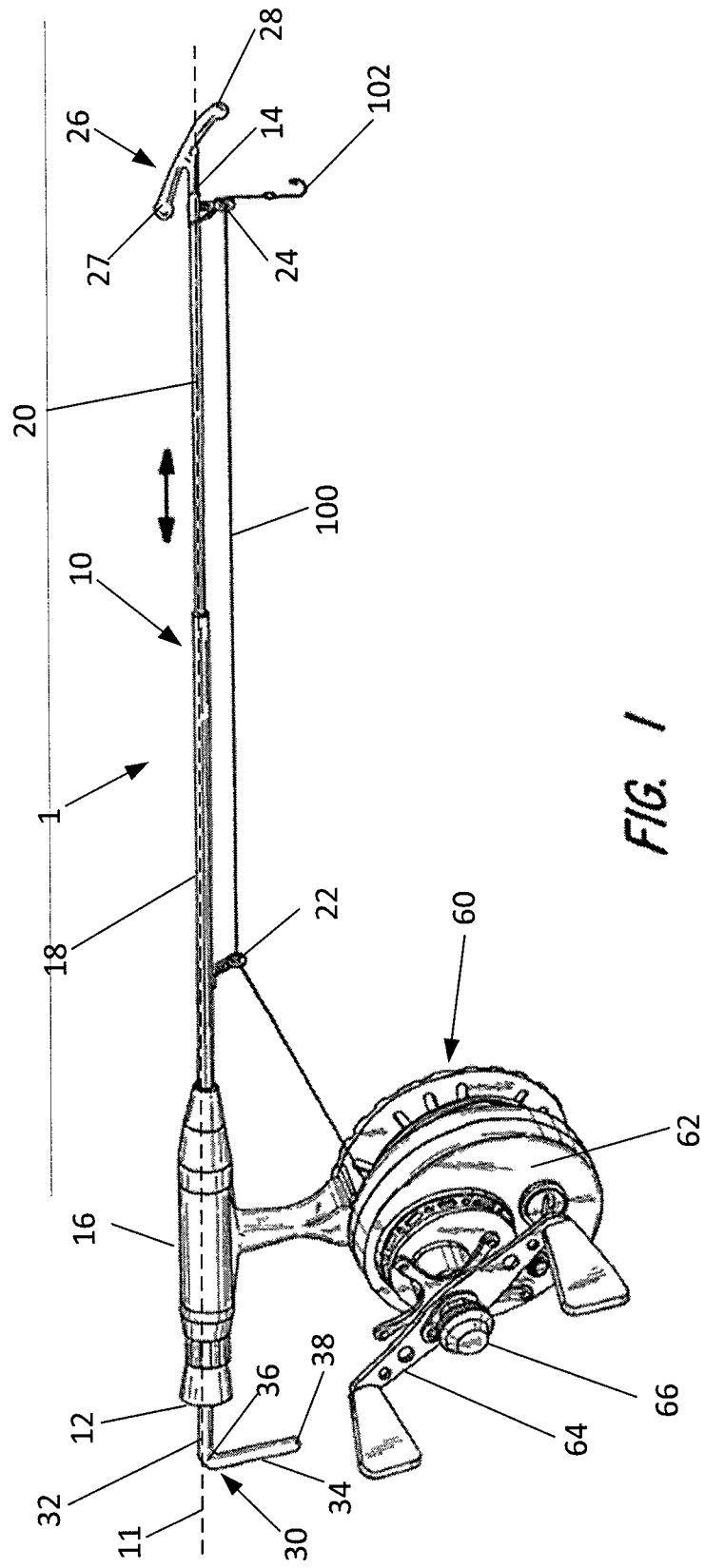
FIG. 1 is a perspective view of the fishing device of the present invention.

This description of the preferred embodiments is intended to be read in connection with the accompanying drawings, which are to be considered part of the entire written description of this invention. In the description, relative terms such as "lower", "upper", "horizontal", "vertical", "above", "below", "up", "down", "top" and "bottom" as well as derivatives thereof (e.g., "horizontally", "downwardly", "upwardly", etc.) should be construed to refer to the orientation as then described or as shown in the drawings under discussion. These relative terms are for convenience of description and do not require that the apparatus be constructed or operated in a particular orientation. Terms such as "connected", "connecting", "attached", "attaching", "join" and "joining" are used interchangeably and refer to one structure or surface being secured to another structure or surface or integrally fabricated in one piece, unless expressively described otherwise.

The fishing device 1 of the present invention comprises an elongate rod 10. The elongate rod 10 includes a first proximal end 12 and a second distal end 14. The elongate rod further comprises a handle section 16 adjacent the first proximal end 12. Extending from the handle section 16 toward the second end 14 are at least two telescoping sections 18 and 20. As illustrated in the drawings, the rod 10 further comprises a pair of eyes 22 and 24. Projecting from the second distal end 14 adjacent eye 24 is a finger tab 26. The finger tab 26 shown comprised a pair of flanges 27 and 28 projecting from the longitudinal axis 11 of elongate rod 10. Even when wearing mittens or gloves, a user can extend or retract the two telescoping sections 18 and 20, by gripping the handle section 16 and the finger tab 26 and apply enough force to either extend or retract the two telescoping sections 18 and 20. The length of the rod 10 is infinitely adjustable between a fully extended configuration and a fully retracted configuration of the telescoping sections 18 and 20.

The finger tab 26 provides other advantages. For example, when the device 1 is used by a child or someone else inexperienced with the sport of fishing, the finger tab 26 provides an added measure of safety. Finger tab 26 shields the second distal end 14 of the rod 10 so that the sharp distal end 14 cannot poke someone in the eye. Also, finger tab 26 separates the end of the device 1 from the hook 102 when the line 100 is retracted and the hook 102 is engaged with the eye 24 of the rod. This reduces the risk of a person inadvertently coming into contact with the hook during transport of the device 1.

The elongate rod 10 is adapted to deflect when the first end 12 is being held and a force is applied to the second end 14. The rod 10 is also adapted to return to an undeflected state when such force is removed. When in the undeflected state, the rod 10 defines the longitudinal axis 11 running through the center of the rod 10.

Projecting rearwardly from the first proximal end 12 of rod 10 is an attachment member 30. The attachment member 30 comprises a first leg 32 attached to the first proximal end 12 of the rod, and more specifically, a portion of the handle assembly 16. The first leg 32 of the attachment member 30 extends rearwardly from the elongate rod 10 along the longitudinal axis 11. Extending downwardly at an angle 36 from the first leg 32 of the attachment member is a second leg 34. The second leg is integrally formed with the first leg and angle 36 is preferably between 15 and 135 degrees. As shown in FIG. 1, this angle 36 is approximately 90 degrees. The attachment member has a free end 38 associated with the second leg 34. This free end 38 is slightly tapered.

FIG. 3 shows a wall bracket 40. The wall bracket 40 shown in FIG. 3 includes at least one semi-cylindrical member 48 having an open top 50 and defining a channel 52. The open top 50 and channel 52 may be tapered to provide a funnel shape adapted to receive the second leg 34 of the attachment member 30. The bracket shown in FIG. 3 further includes a flat plate 42 coupled to member 48. When the bracket 40 is made of metal the bracket may be fabricated by welding the flat plate to member 48. When the bracket 40 is made of plastic, plate 42 and member 48 may be molded together as a single unit. The flat plate 42 has at least one hole 44. A screw can be inserted through the hole(s) to fasten the bracket 40 to the wall of an ice fishing shelter or any other desired surface.

When the bracket 40 is attached to a wall of an ice fishing shelter and the second leg 34 is received within the channel 52 of bracket 40, the fishing rod 10 projects from the wall. When the angle 36 is 90 degrees as shown, the rod will extend substantially parallel to the ice assuming the wall of the enclosure is vertical.

Based upon the foregoing description, one of ordinary skill in the art will appreciate the attachment member 30 and the bracket 40 can be easily coupled together so that the rod 10 can be held in position hands-free. Further, one skilled in the art from the foregoing discussion will understand that the rod 10 can be easily disconnected from the wall bracket 40 by simply lifting the rod 10 to disengage leg 34 of the attachment member 30 from the wall bracket 40.

The design of bracket 40 can, of course, be modified. An alternative bracket 40 is shown in FIG. 4. This bracket is essentially an eye bolt having an open top 50 defining a round channel 52 adapted to receive the second leg 34 of the attachment member 30. The eye bolt bracket 40 shown in FIG. 4 has a threaded spike 43 adapted to be screwed into the wall 104 of an ice fishing shelter or the like instead of the plate 42 shown in FIG. 3.

The means to attach the bracket 40 may likewise be modified. For example, when the ice fishing shelter is a tent-like structure supported by fiberglass or aluminum support poles, the bracket 40 may be attached using a strap that wraps tightly around the bracket 40 and a support pole. Such a strap may be fastened in place using a hook and loop (e.g. VELCRO™) closure, buckle or the like. Electrical ties and various types of clamps may also be employed to attach and hold the bracket 40 at a desired location within the shelter or to some other desired structure.

Figure 2:
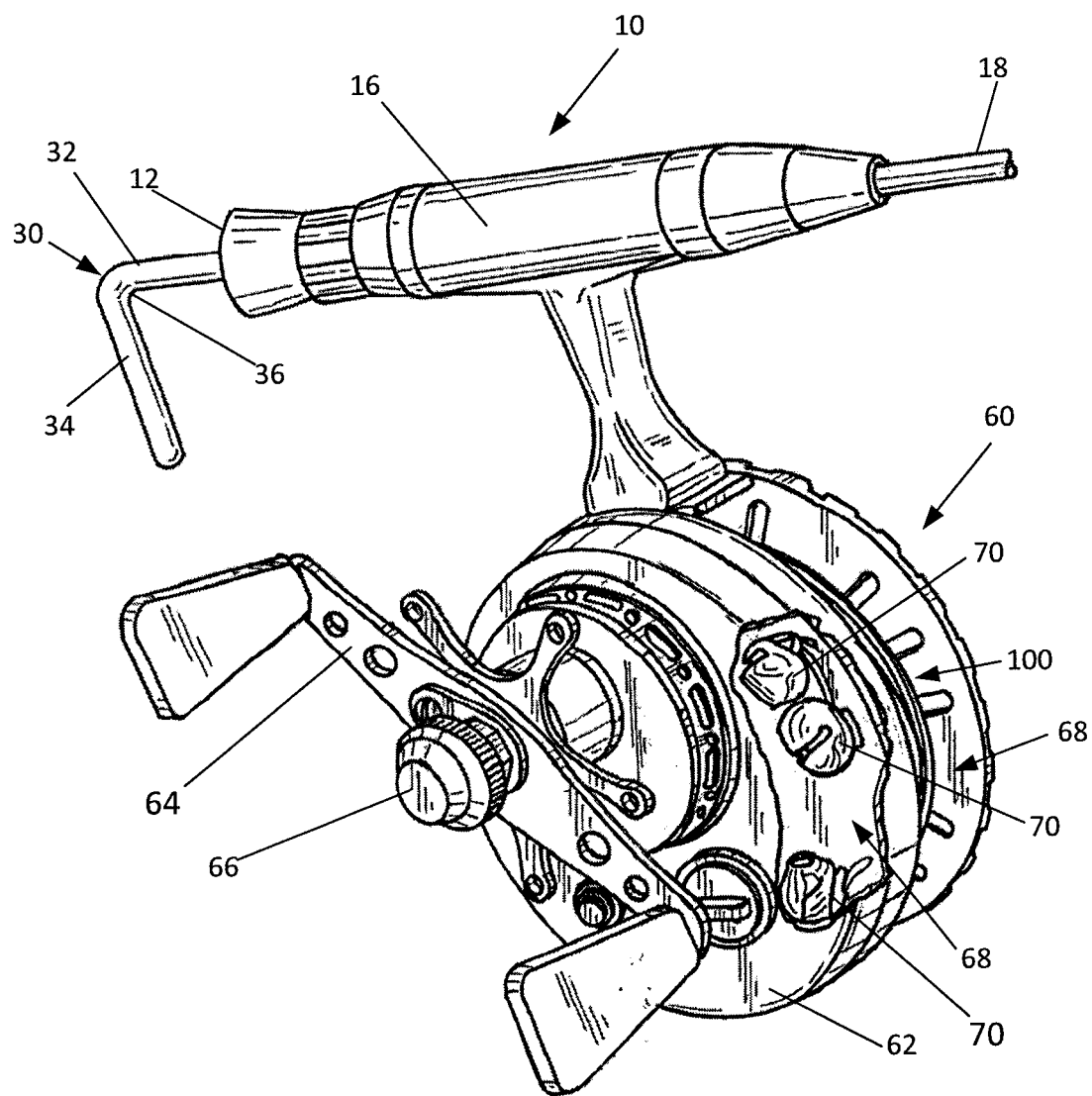
FIG. 2 is perspective view of the reel portion of the fishing device of FIG. 1 with a portion of the housing cut away.
Figure 5:
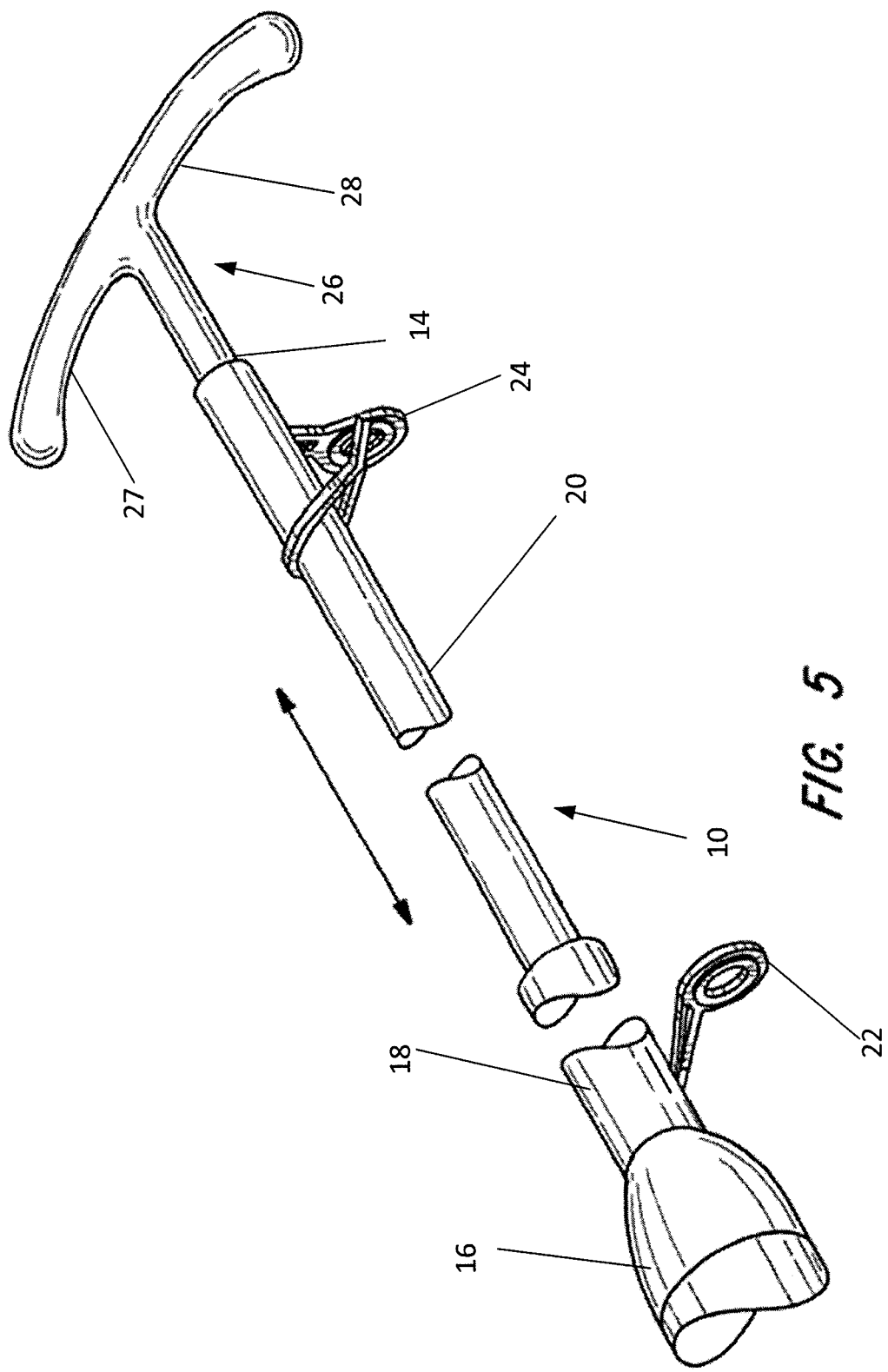
FIG. 5 is a perspective view illustrating the telescoping sections and a pair of flanges projecting from the distal end of the rod of the fishing device of FIG. 1.

FIGS. 1 and 2 shows a reel 60 having a housing 62 and a crank 64. An axle 66 couples the crank 64 to a spool 68 located within the housing. The spool 68 is specifically adapted to receive an alarm 70 (e.g., bells or glass beads). The design of the reel housing 62 may likewise we adapted to accommodate the spool 68 and alarm 70. As the spool 68 is rotated either by the crank or by a fish pulling on the fishing line 100, alarm 70 generates noise alerting a person fishing using the fishing device 1 that a fish is on the line 100.

The fishing device 1 of the present invention offers many advantages over a standard fishing rod. First, the fishing device 1 of the present invention is adapted to be held hands-free. Second, when ice fishing the fishing device 1 of the present invention includes a telescoping rod 10 that allows the rod, when held hands free, to have its second end 14 positioned over a hole cut in the ice such that the fishing line 100 and hook 102 can be deployed through the ice to the water and fish below. Further, if a person fishing with the fishing device 1 of the present invention becomes distracted and a fish is hooked, the alarm 70 will sound alerting the person that a fish is on the hook 102.

Of course, various modifications of the present invention can be made without deviating from the invention. For example, the attachment member 30 may be designed so that its first leg 32 is made in multiple telescoping sections to provide even greater flexibility related to the overall length of the device 1 and the positioning of the second end 14 of the rod 10 over a hole cut in the ice.

Likewise, rather than extending directly from the first proximal end of the rod 12, the first leg 32 of attachment member 30 may be affixed to the handle of the rod adjacent the first proximal end 12 in a fashion that allows the second leg 34 to extend downwardly behind the rod. This is sometimes advantageous when adapting the invention to a preexisting rod so that no holes need to be drilled into the rod or rod handle to fasten the attachment member 30 to the rod 10. The device used to secure the first leg 32 to the rod (or rod handle) is preferably adapted to align the first leg 32 of the attachment member so that it extends along or parallel to the longitudinal axis of the rod when the rod is not deflected. One such mounting device 110 is shown in FIGS. 6 and 7.

The mounting device 110 has an end wall 112 from which the first leg 32 of the attachment member 30 extends. The mounting device also has a channel 116 adapted to receive the proximal end 12 and a portion of the handle 16 of the rod 10. This channel 116 is defined by a bottom wall 113 and a pair of opposing side walls 114 and 115. Side wall 114 has a taller distal section 117 having a first inwardly projecting catch 118. The side wall 115 similarly has a taller distal section 119 with a second inwardly projecting catch 120.

To use the mounting device 110, the proximal end 12 of the rod 10 can be inserted between the taller distal wall sections 117 and 119 until it comes to rest against the wall 112. The rod 10 is retained within the mounting device 110 because the handle 116 is sandwiched between the to side walls 114 and 115, and between the bottom wall 113 and the catches 118 and 120.

Alternatively, if the taller distal sections 117 and 119 are sufficiently resilient (i.e., able to spring back into shape after bending), the proximal end 112 of the rod may be inserted into the channel 116 so that it rests an angle against the wall 112 with the handle resting above the catches 118 and 120. The user can then squeeze the top of the rod handle 16 and the bottom 113 of the device 110 with enough force to temporarily displace the taller distal sections 117 and 119 a sufficient distance to accommodate the widest diameter of the rod handle 16 passing into the channel 116 between the catches 118 and 120. The taller distal sections 117 and 119 will then snap back to the original position shown in FIG. 7 to firmly secure the mounting device 110 to the rod 10.

As further illustrated in FIG. 6, once the mounting device 110 is coupled to the rod 10, that assembly may be coupled to the bracket 40 by inserting the second leg 34 of the attachment member 30 into the channel of the bracket 40 via the opening 50.

Alternative or additional alarm means may also be provided. These could include an electronic circuit comprising a switch triggered by some action of the rod or reel, a battery, and a buzzer or light powered by the battery when the switch is triggered. For example, pulling of the line 100 can cause a switch to be triggered illuminating a light source or causing a buzzer to sound. Also, rather than positioning bells or glass beads inside the reel 60, a bell could be coupled to the finger tab(s) 26 such that the bell sounds whenever the rod 10 is moving between a deflected and an undeflected states.

Various modifications can be made to the bracket 40 mounted to the wall of the fishing enclosure so long as the bracket 40 is adapted to mate with the second leg 34 of the attachment member 30 to securely hold the rod 10. Also, the channel 52 formed by the bracket 40 and the second leg 34 of the attachment member 30 are adapted to permit easy decoupling of the second leg 34 from the bracket 40. The fit between the channel 52 and the second leg 34 may be sufficiently loose to allow the fishing rod 10 to be swung about the longitudinal axis of the leg 34 to permit rotation of the entire device 1 relative to the wall. Further, the bracket 40 may be coupled to some structure other than the wall of an ice fishing shelter. Such structures may include a fence, dock, pier, boat, post or the like.

Thus, the foregoing description is intended to be exemplary rather than limiting and the subject invention is limited only by the claims provided below:

The invention claimed is:

1. A fishing device comprising:
    a. an elongate rod extending between a first end and a second end;
    b. an attachment member comprising a first leg and a second leg, the first leg adapted to be coupled to the elongate rod so that it extends rearwardly from the elongate rod, the second leg extending from the first leg at an angle of between 15 degrees and 135 degrees;
    c. a reel coupled to the elongate rod, said reel comprising a housing and a spool located within the housing, said spool adapted to rotate;
    d. an alarm; and
    e. a flange projecting from the rod adjacent the second end of the rod.

2. The fishing device of claim 1 wherein the alarm is within the housing of the reel.

3. The fishing device of claim 2 wherein the alarm, comprises an element selected from a group consisting of bells and beads, and is adapted to generate a sound when the spool rotates.

4. The fishing device of claim 1 wherein the elongate rod comprises a plurality of telescoping sections.

5. The fishing device of claim 1 further comprising a bracket adapted to be attached to a vertical wall and to be selectively coupled to the second leg of the attachment member so that the attachment member supports the elongate rod in a position extending away from the vertical wall.

6. The fishing device of claim 5 wherein the second leg is adapted to pivot relative to the bracket when coupled to the bracket.

7. The fishing device of claim 5 wherein the second leg is adapted to be decoupled from the bracket by lifting the second end of the elongate rod relative to the bracket.

8. The fishing device of claim 1 wherein the first leg of the attachment member comprises a first leg section and a second leg section, wherein said first leg section and said second leg section are adapted to telescope with respect to each other.

9. A fishing device for use in a fishing enclosure surrounding a hole through ice and having a wall to which a bracket is attached, said ice fishing device comprising:
   a. an elongate rod extending between a first end and a second end;
   b. an attachment member comprising a first leg and a second leg, the first leg adapted to be coupled to the first end of the elongate rod and extend rearwardly from the elongate rod, the second leg extending from the first leg at an angle of between 45 degrees and 135 degrees and adapted to be selectively coupled to the bracket so that the attachment member supports the elongate rod in a position extending away from the wall; and
   c. a reel coupled to the elongate rod, said reel comprising a housing and a spool located within the housing, said spool adapted to rotate;
   d. an alarm; and
   e. a flange projecting from the rod adjacent the second end of the elongate rod.

10. The fishing device of claim 9 wherein the reel has a housing and the alarm is within the housing.

11. The fishing device of claim 10 wherein the alarm, comprises an element selected from a group consisting of bells and beads, and is adapted to generate a sound when the spool rotates.

12. The fishing device of claim 9 wherein the elongate rod comprises a plurality of telescoping sections.

13. The fishing device of claim 9 wherein the second leg is adapted to pivot relative to the bracket when coupled to the bracket.

14. The fishing device of claim 9 wherein the second leg is adapted to be decoupled from the bracket by lifting the second end of the elongate rod relative to the bracket.

15. The fishing device of claim 9 wherein the first leg of the attachment member comprises a first leg section and a second leg section, wherein said first leg section and said second leg section are adapted to telescope with respect to each other.

16. A fishing device comprising:
   a. an elongate rod extending between a first end and a second end and having a handle adjacent the first end;
   b. a bracket adapted to be mounted to a vertical surface;
   c. an attachment member comprising a first leg and a second leg, the first leg adapted to be coupled to the first end of the elongate rod and extend rearwardly from the elongate rod along the longitudinal axis, the second leg extending from the first leg at an angle of between 45 degrees and 135 degrees and adapted to be selectively coupled to the bracket, wherein the second leg is adapted to pivot relative to the bracket when coupled to the bracket and to be decoupled from the bracket by lifting the first end of the elongate rod relative to the bracket; and wherein the first leg of the attachment member comprises a first leg section and a second leg section, said first leg section and said second leg section adapted to telescope with respect to each other;
   d. a reel coupled to the elongate rod, said reel comprising a housing and a spool within the housing, said spool adapted to rotate;
   e. an alarm comprising an element selected from a group consisting of bells and beads, and adapted to generate a sound when the spool rotates.

17. The fishing device of claim 16 further comprising a flange projecting from the rod adjacent the second end of the rod.

* * * * *